United States Patent [19]
Herzberg

[11] 3,722,866
[45] Mar. 27, 1973

[54] APPARATUS FOR FEEDING A GAS FURNACE

[75] Inventor: Claude Herzberg, Bron, France

[73] Assignee: Societe Generale Des Produits Refractories, Paris, France

[22] Filed: Apr. 5, 1971

[21] Appl. No.: 131,365

[30] Foreign Application Priority Data

Apr. 3, 1970 France .............................. 70/12124
Apr. 3, 1970 France .............................. 70/12127

[52] U.S. Cl. ...... 432/175, 236/2 R, 431/329, 432/31
[51] Int. Cl. .............................................. F27b 3/02
[58] Field of Search .......... 263/40, 43, 2, 4; 431/328, 431/329

[56] References Cited

UNITED STATES PATENTS

| | | |
|---|---|---|
| 3,248,099 | 4/1966 | Bratko .................................. 263/43 |
| 2,194,208 | 3/1940 | Moran .................................. 431/328 |
| 3,270,798 | 9/1966 | Ruff ..................................... 431/329 |
| 2,289,719 | 7/1942 | Moran .................................. 263/43 |
| 3,087,041 | 4/1963 | Vonk .................................. 431/328 X |
| 3,485,230 | 12/1969 | Harrington et al. ............... 431/329 X |
| 3,269,449 | 8/1966 | Witten, Jr. ......................... 431/328 |

Primary Examiner—John J. Camby
Attorney—Webb, Burden, Robinson & Webb

[57] ABSTRACT

A method and apparatus for providing substantially uniform temperature in a furnace or kiln heated by combustion of an air-fuel mixture. A distribution chamber is provided having at least one permeable wall adjacent the combustion chamber. The permeable wall comprises a refractory material, either fabric or felt, of ceramic fibers. The air-fuel mixture is introduced into the distribution chamber at a pressure in excess of that in the combustion chamber. In this way the air-fuel mixture slowly passes through the permeable wall and is ignited and burned over a large area within the combustion chamber.

8 Claims, 7 Drawing Figures

Patented March 27, 1973  3,722,866

INVENTOR.
CLAUDE HERZBERG
BY
Webb, Burden, Robinson & Webb

Patented March 27, 1973 3,722,866

INVENTOR.
CLAUDE HERZBERG
BY
Webb, Burden, Robinson & Webb

Patented March 27, 1973

INVENTOR.
CLAUDE HERZBERG

BY

Webb, Burden, Robinson & Webb

APPARATUS FOR FEEDING A GAS FURNACE

The invention relates to a method for introducing gaseous fuel into a furnace and for apparatus for practicing the method. Traditionally, kilns or furnaces have two distinct element; namely, the enclosure comprising the roof, walls and floor which are insulated as well as possible to contain heat and the burners which provide the heat.

Most frequently, the inner walls are made of dense refractory and the outer walls of insulating materials. The furnace is stationary and its thermal inertia is very great. Even when using materials such as lightweight refractory brick with a density of about 0.4 gm/cc, the construction is still heavy and the thermal inertia is high. Moreover, in spite of the presence of many burners, undesirable differences in temperature are observable between the zones near the burners and the more remote points in the furnace. The recycling devices which are occasionally installed to overcome this drawback are all the more sensitive the higher the temperature.

Briefly, the present invention relates to a new method for supplying fuel to a gas furnace which allows very flexible lightweight furnaces usable up to 1,200°C. This invention further deals with the apparatus for implementing the method and to the furnaces incorporating the apparatus. The method comprises the steps of first delivering the air-fuel mixture of gases to a thin space, i.e., distributing chamber within the furnace extending along at least one portion of its walls at a pressure that is greater than that of the combustion zone and then passing the gases into the said combustion zone through a permeable surface consisting of at least one layer of a fabric or felt composed of refractory material, preferably with a base of ceramic fibers.

The gases delivered through the distributing chamber burn within the combustion chamber of the furnace over an entire surface of the wall which is made of a permeable refractory fabric. The replacement of independent burners by heating walls with a surface as large as desired makes it possible to obtain excellent homogeneity of temperature in the interior of the furnace.

The uniformity of the gas distribution in the distributing chamber which is located between the airtight outer wall of the furnace and the permeable interior wall will be improved if these gases arrive through several orifices and passageways distributed in this chamber. These passageways may be made of the same type of permeable refractory fabric or felt as the permeable wall.

The uniformity of the combustion is better when the gases pass slowly through the permeable wall. It is, therefore, advantageous to make the distributing passageways and/or the permeable wall out of several layers of refractory fabric or felt. Moreover, these textile walls form a safety device against flame strike-back.

The air-fuel mixture may be obtained very simply by making them pass into a single pipeline before they are introduced into the distributing chamber.

Contrary to the conventional manner of heating by means of burners, where the flame is all the shorter the nearer the air-gas dosage is to stoichiometry, the method of the invention permits steady and danger-free combustion of the stoichiometric mixture over a large area. It functions in a satisfactory manner substantially insensitive to the composition (air-fuel ratio) of the combustible mixture.

One type of furnace using the method of the invention comprises airtight refractory exterior walls, a permeable refractory interior wall extending along at least a portion of the outer wall and at a slight distance therefrom, means for feeding combustible gas from the chamber disposed between the two walls at a pressure higher than that of the furnace interior. Of course, means must be provided for exhausting the combustion products.

The exterior walls may be made of dense bricks, of lightweight bricks or even of metal. Preferably, they will consist of layers of ceramic felt with a base of refractory mineral fibers, covered at least on the inside with refractory fabric that has been rendered impermeable by a ceramic coating which stiffens it and prevents the combustible gases from escaping to the outside. Sheathing in the form of refractory metal grating advantageously reinforces the padding. Since effective ceramic padding weighs 1 kg per square meter, the construction of the furnace is made substantially lighter and it is even possible to devise movable furnaces, as will be described hereinafter.

The same fabric may be used to form the airtight exterior wall, the permeable refractory wall and the distributing passageways for the gas. Preferably, it is made of fibers having a metallic core covered with refractory mineral fibers.

Other objects and advantages of this invention will become apparent from the following detailed description made with reference to the drawings in which.

Figure 1:
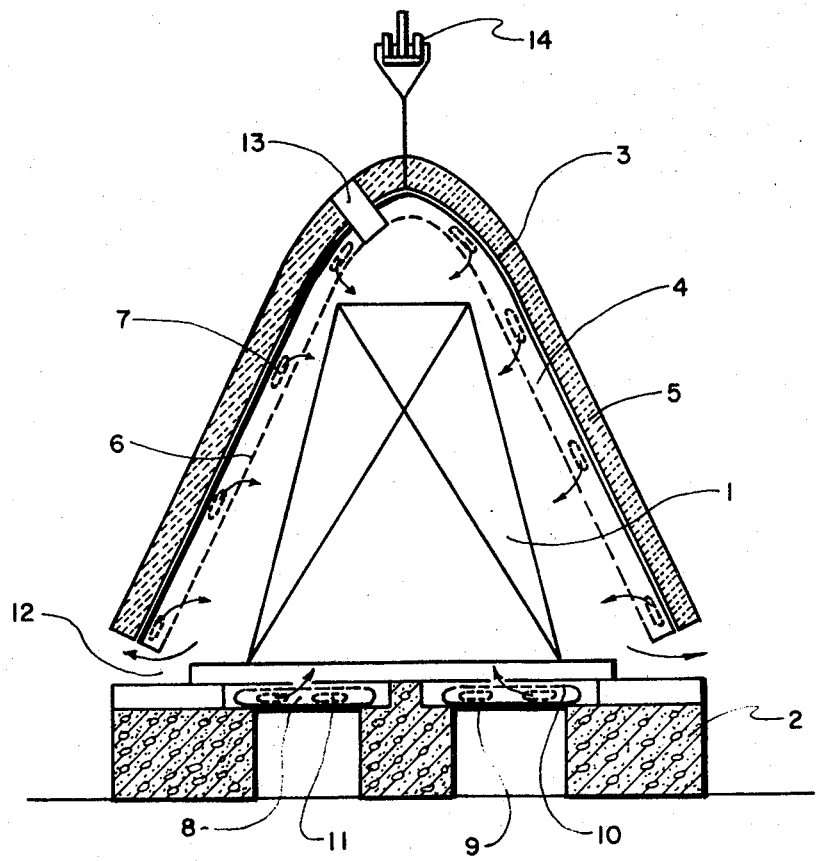
FIG. 1 is a schematic cross section of a furnace according to this invention.

Referring to FIG. 1, the charge 1 that is to be fired is placed on a refractory base resting on blocks of masonry 2 provided with slits for allowing the secondary air of combustion to enter. The vaulted roof 3 is a hood about 2.5 m long, 1 m wide and 1 m high. It is comprised, for example, of a fabric of fibers comprising two elementary fibers that are twisted together and have a refractory steel core coated with kaolin wool fibers.

The ceramic fibers must be selected to remain integral at the temperature of use. Therefore, for lower temperature applications, naturally occurring asbestos fibers may be used. For high temperature applications, synthetic fibers known as kaolin wool and the like may be used.

This fabric is rendered impermeable on both sides by a refractory coating with a base of chamotte and a binder, for example, sodium tripolyphosphate. It is supported on the inside by a grating 4 of stainless steel which is hung on a lightweight exterior frame (not shown). On the outside it is covered for heat insulation with a layer 5, for example, ceramic felt which is 4 cm thick and has a density of 48 kg/m³.

On the interior of this vaulted roof and attached thereto at a distance of 2 to 4 cm there is the permeable refractory wall 6 of the same material as above, but without the coating. The space between the roof and the permeable wall constitutes the distributing chamber for the combustible air-fuel mixture, fed through longitudinal passages such as 7 and distributed over the entire roof. The floor is self-heating due to a gas feeding device extending under the charge and consisting of two longitudinal gas distributing chambers 8 whose lower wall 9 is made of impermeable refractory fabric and whose upper wall 10 is made of a permeable refractory fabric as in the case of the heating roof described above.

The permeable fabrics may be comprised of two types of fibers, i.e., refractory metal and ceramic as described above or in some applications, simply of ceramic fibers.

The refractory materials are formed, for example, by extruding a batting of fiber with an inorganic binder such as sodium silicate.

The gases arrive by way of permeable longitudinal passages 11. The stream of pressurized gas is diffused in a homogeneous manner over a very large area. The combustion which is thus produced over the entire interior face of the permeable walls of the floor and the vaulted roof is extremely uniform. The combustion products are exhausted through the space 12 provided between the base of the vaulted roof and the floor and possibly through closable exhaust lines 13 passing through the roof.

The roof of this type of furnace weighs about 30 kg. It can be lifted and moved as desired with the aid of a simple pulley block 14 so as to allow the charge that is to be fired to be set in place or to be removed after firing and cooling.

In another embodiment of furnaces operating in accordance with the method of the invention, the heating roof is not required. The roof is then made merely of the airtight heat-insulated external wall. Only the floor is heated as in the case of the embodiment shown in FIG. 1.

Burner elements have also been made which consist basically of a frame supporting an airtight wall, possible heat-insulated, and a gas-permeable wall leaving between them a distributing chamber of slight thickness into which the air-fuel mixture is introduced at an excess pressure and will burn in the furnace outside of the chamber after having passed through the permeable wall. This airtight wall is made of any suitable material, particularly of metal (such as refractory steel sheeting) or of ceramic fabric rendered impermeable by coating. According to this invention, the permeable wall is made of a fabric with a ceramic fiber base. These burner elements may be placed opposite one another, or may be coupled to one another to form large areas of heat. They may be placed inside the furnace or they may form at least a portion of the furnace walls themselves. They may be varied as to their shape.

Figure 2:
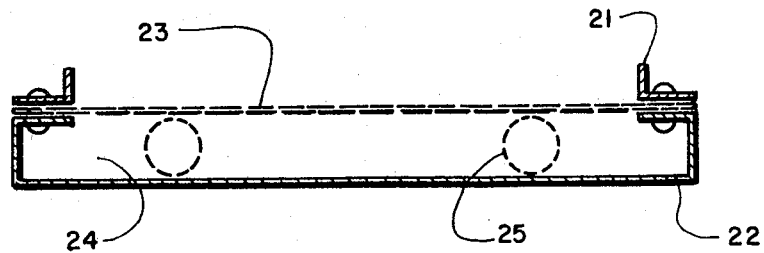
FIGS. 2 and 3 are schematic drawings of a section and plane view of a flat panel burner according to this invention.
Figure 3:
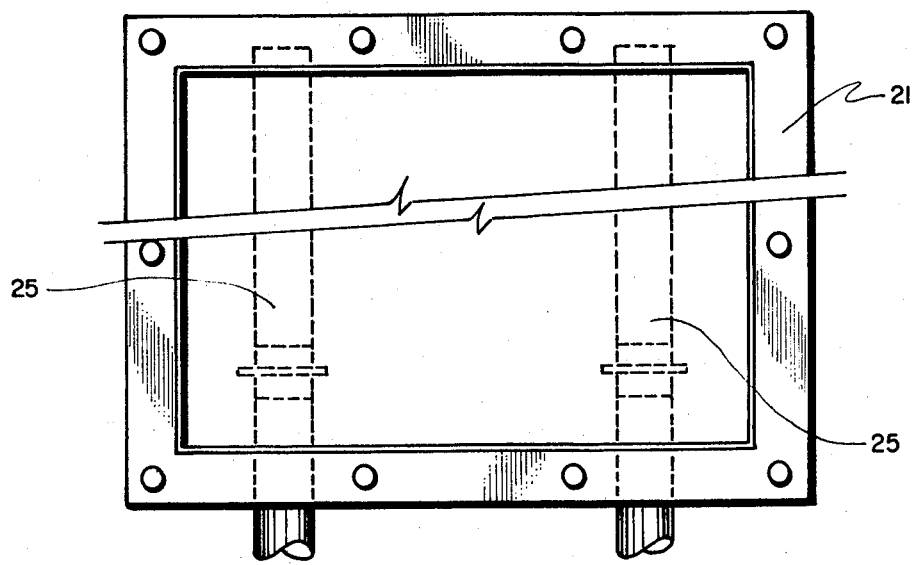

Referring to FIGS. 2 and 3, a burner panel according to this invention comprises a frame of angle irons 21 supporting a folded refractory sheet of stainless steel 22 and a permeable ceramic fabric 23 in such a manner as to form a distributing chamber 24 for the combustible mixture fed through two passages 25 made of permeable ceramic fabric. These panels may be positioned opposite one another or may be connected to one another.

Figure 4:
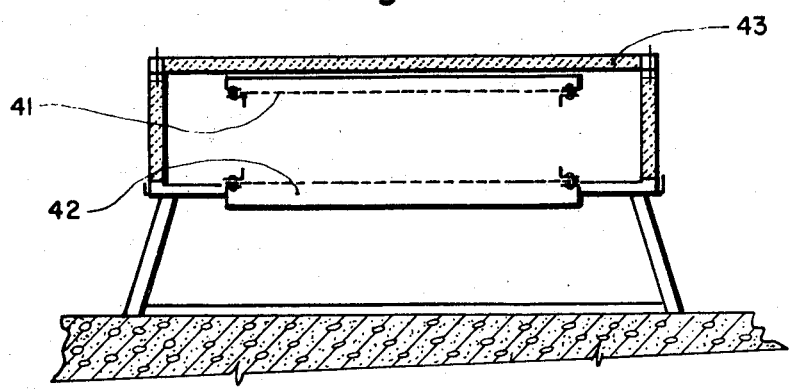
FIG. 4 is a schematic section view of a furnace according to this invention incorporating the panels shown in FIGS. 2 and 3.

Referring to FIG. 4, a furnace according to this invention may comprise an upper row 41 and a lower row 42 of burner panels. The upper row is suspended from the heat-insulated arched roof 43. The lower row forms a heating floor. The entire furnace is very light in weight and may be mounted on tubular steel feet.

Figure 5:
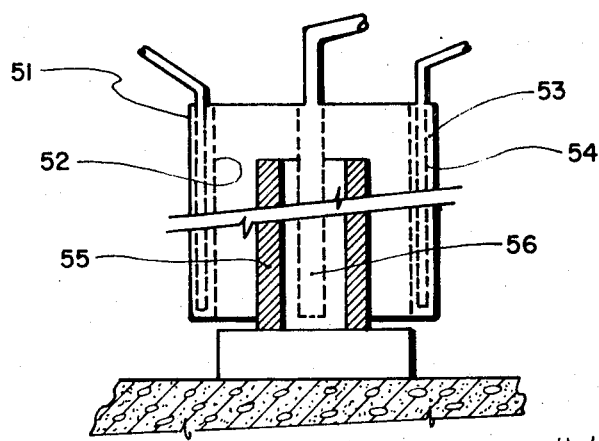
FIG. 5 is a schematic drawing of a furnace according to this invention for heating tubular wear.

Referring to FIG. 5, a tubular burner intended for preheating pipes in a vertical position comprises a burner element composed of two coaxial cylinders. The outer cylinder 51 is made of a rigid and impermeable coated ceramic fabric stretched over a frame. The inner cylinder 52 is made of permeable ceramic fabric. Between them they define an annular chamber 53 fed by the passages 54 with a combustible mixture under excess pressure which passes through the permeable wall in order to burn over the entire surface of the ware, i.e., the tube 55 to be preheated. At the same time, in the interior of the tube 55 a passage 56 is disposed which is made of permeable ceramic fabric and is also fed with a combustible gaseous mixture in such a way as to heat the tube simultaneously on the inside in order to obtain completely homogeneous heating.

Other shapes besides the flat panel and the cylinder are suitable for making the burner elements whose shape will be adapted to the type of heating desired and to the shape of the pieces that are to be heated.

The method of the invention and the various ways of implementing it can used wherever a very uniform temperature is required in an enclosed space or around a piece. These furnaces are particularly advantageous for firing ceramic pieces.

The burners according to the invention may comprise pipes with a closed end, for example, consisting of at least one ply of porous refractory material essentially formed by ceramic fibers rolled into a more or less cylindrical shape. The pipe is fed with a mixture of gas and air under pressure which then evolves through the porous wall of the pipe and burns to the combustion chamber where it burns.

Figure 6:
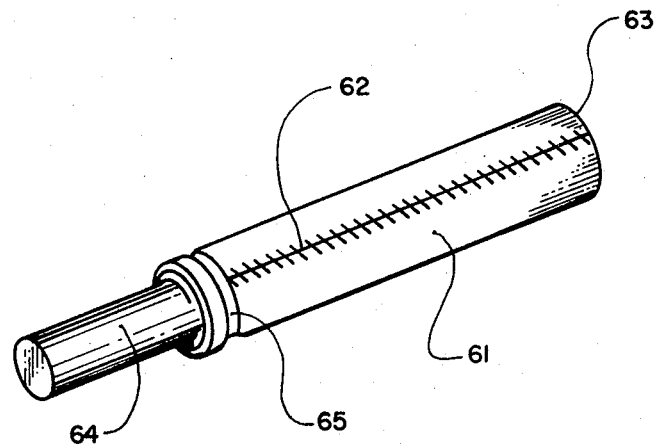
FIG. 6 is a schematic drawing of a tubular burner according to this invention; and, FIG. 7 is a schematic drawing of a tubular burner according to this invention which has been coiled.

FIG. 6 is a schematized burner according to the invention. A woven material whose threads are essentially made of ceramic fibers was rolled up three times and sewed up all along a generating line 62 so as to form a pervious-walled pipe 61. The end 63 was also closed by sewing it up. The pipe slid around the gas feeding pipe 64 and tightness was rendered effective by the clamping band 65.

Figure 7:
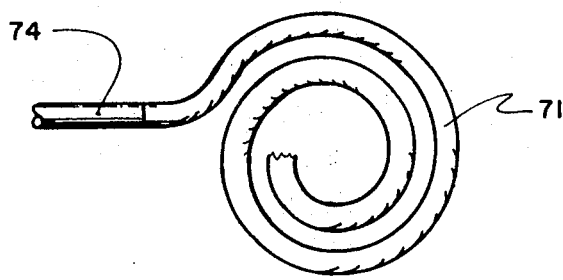

Such burners may be set out in a furnace all along the materials being heated or fired. They can be placed on the hearth or hung on the walls. Owing to their constitution they are endowed with a relative pliancy which renders it possible to have them coiled up as shown in FIG. 7.

Employing such burners allows to reach a remarkably uniform temperature in any kind of container not provided with integrated burners.

Having thus described the invention with the detail and particularity as required by the Patent Laws, what is desired protected by Letters Patent is set forth in the following claims.

I claim:

1. A furnace comprising an arched roof comprising an airtight lightweight hood and an inner refractory wall made of a fabric with a base of ceramic fibers, the side wall being permeable to combustible gases, said inner and outer walls defining a distribution chamber along at least one portion of the furnace interior which defines the combustion chamber, means for introducing the combustible gases into the distribution chamber at a pressure greater than that of the furnace interior and means for exhausting the combustion products.

2. A furnace according to claim 1 wherein at least one part of the outer wall is heat-insulated sheets of ceramic fiber felt.

3. A furnace according to claim 2 having an arched roof comprising an airtight lightweight hood of a ceramic fiber base and a floor comprising a refractory permeable inner wall extending over at least a portion of the floor defining a distribution chamber, means for feeding the combustible gases under pressure to the distribution chamber and means for exhausting the combustion products.

4. A furnace according to claim 1 wherein the combustible gases are delivered to the distribution chamber by permeable flues made of fabric with a base of ceramic fibers, said flues extending into the distribution chamber.

5. A furnace according to claim 1 comprising a hearth and wherein the means for exhausting the combustion products comprise a space between the hood and the hearth.

6. A furnace according to claim 5 comprising means for adjusting the height of the hood above the hearth.

7. A furnace comprising:
an arched roof being an outer airtight lightweight hood comprising at least in part heat insulating material of a ceramic fiber base and an inner permeable refractory roof wall of a fabric having a ceramic fiber base, said inner and outer roof walls defining a distribution chamber along at least a portion of the furnace interior which defines the combustion chamber;
a floor comprising a refractory permeable inner wall extending over at least a portion of the floor defining a second distribution chamber;
means for introducing combustible gases into said distribution chambers at a pressure greater than that of the furnace interior; and,
means for exhausting the combustion products.

8. A furnace according to claim 7 wherein the exhausting means comprises an opening supported by adjustable spacers between the floor and the base of the lightweight roof.

* * * * *